Figure 1:
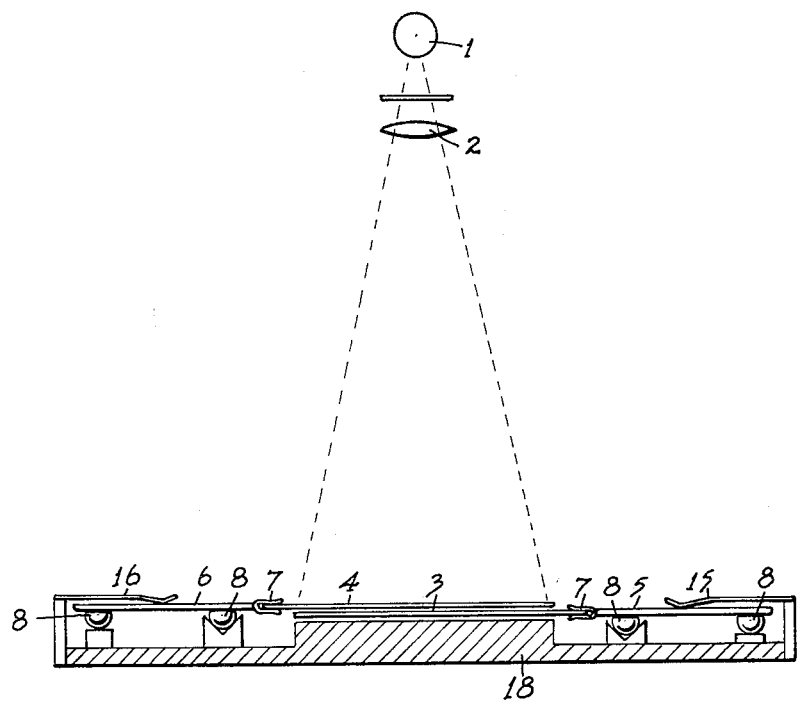

March 6, 1962 L. D. EVANS ETAL 3,023,509
ACCURATE LOCATION SYSTEMS FOR REPETITIVE POSITIONING
IN IMAGE REPRODUCTION PROCESSES
Filed Oct. 12, 1959 3 Sheets-Sheet 2

March 6, 1962 L. D. EVANS ETAL 3,023,509
ACCURATE LOCATION SYSTEMS FOR REPETITIVE POSITIONING
IN IMAGE REPRODUCTION PROCESSES
Filed Oct. 12, 1959 3 Sheets-Sheet 3

United States Patent Office 3,023,509
Patented Mar. 6, 1962

3,023,509
ACCURATE LOCATION SYSTEMS FOR REPETITIVE POSITIONING IN IMAGE REPRODUCTION PROCESSES
Leonard David Evans, 7 Shearing Ave., Oaklands, South Australia, Australia, and Agnes Cannon, 5 Woodley Road, Glen Osmond, South Australia, Australia
Filed Oct. 12, 1959, Ser. No. 845,858
Claims priority, application Australia Oct. 13, 1958
4 Claims. (Cl. 33—184.5)

The art of photographing enlargement and reproduction whereby a source of light is arranged to project the details of a transparent photographic plate or film or other image through a lens system onto a distant photo-sensitive surface, located so that the desired size of reproduction relative to the said plate, film or image is obtained, is well known.

Similarly the art of colour and multi-colour reproduction by the direct reflex xerographic and other photographic processes, either by enlargement or by contact printing which gives a one to one ratio of dimensions is well known.

In some processes the photo-sensitive paper, plate or surface onto which the image is to be formed is exposed several times, using on each occasion a suitable colour filter or colour separation transparency inserted in the path of a multi-coloured light beam, in order to obtain the desired colour make-up in the reproduction.

In xerographic and some other systems of photographic colour and multi-colour reproductions, the exposed paper, plate or surface is developed and fixed with the appropriate colour chemical solutions after each colour exposure. In other applications the developer and fixing process occurs after all the colours have been exposed. In all cases the said paper, plate or surface and/or the colour filters or other colour application or multi-process media must be registered in a discrete position so that each exposure or process registers precisely with each other on the photo-sensitive paper, plate or surface.

Previous practise has been to employ visual and optical means to effect this relocation, and this is a time consuming operation which must be accurately carried out and requires a high degree of manual skill.

The present invention describes a system of registration or location of the reproduction means or medium, which may include the photo-sensitive paper, plate or surface, the colour separation transparencies, the light transmitting original, stencils, masks or other printing units, so that these may be removed and replaced any number of times in enlarging photographic or other image reproduction systems and always register sensibly in the same position each time.

The invention consists in using locating members for repetitive positioning in image production processes which includes three abutment points on the member to be registered, or on a holder therefore, and three surfaces co-acting with the said abutment points and triangularly spaced on a base to align the said member in one plane when supported thereon and shaped to give angular and point location in the plane of the member.

It is a well known principle, which is exemplified in Lord Kelvin's kinematic coupling, that six points of constraint plus gravity or other closing force or forces locates one body with respect of another in the discrete manner, and that principle is incorporated in the present invention.

In the present system the lack of redundant constraint allows precise location without mechanical distortions, which makes the positioning error of the locating unit such that it does not require these units to be made to a high degree of mechanical accuracy.

Figure 2:
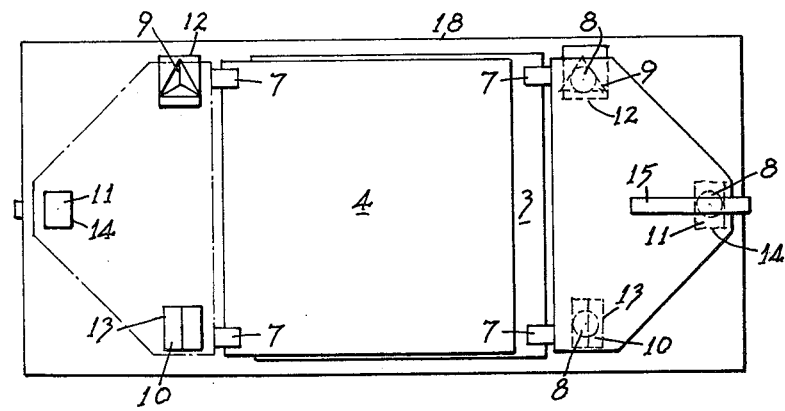
Figure 3:
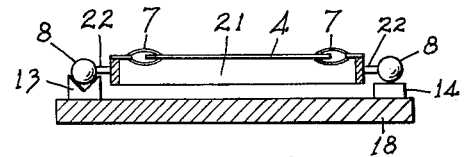
Figure 4:
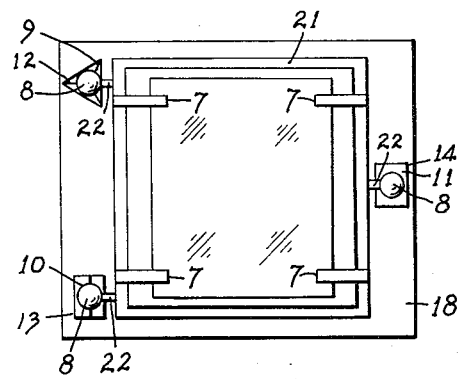
Figure 5:
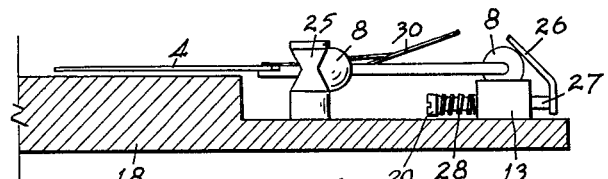
Figure 6:
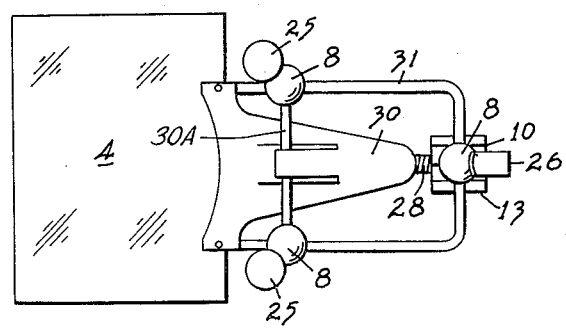
Figure 7:
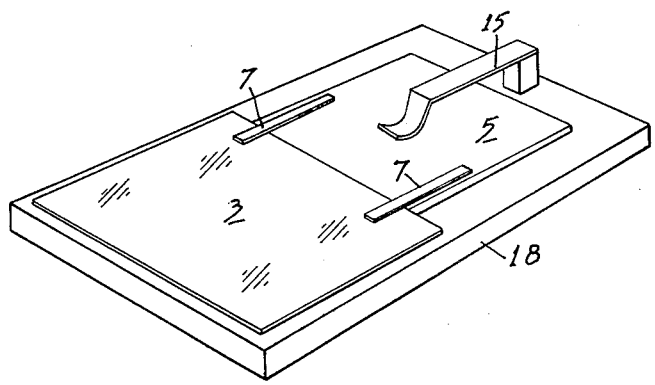
Figure 8:
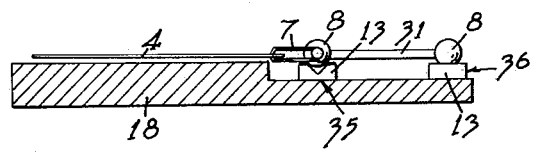
Figure 9:
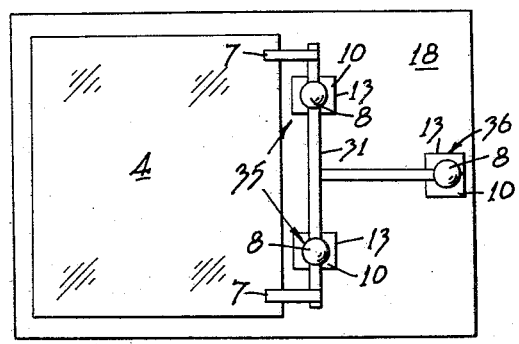

In order however that the invention may be more clearly understood, embodiments will now be described with reference to the accompanying drawings in which:

FIG. 1 is a sectional side elevation of the invention applied to the printing of a surface through a mask such as in an enlarger, FIG. 2 is a plan of same with the holder on one side omitted but its position being indicated by the chain lines, FIG. 3 shows how a single mounting frame to carry a transparency or the like can be arranged, this view being a sectional side elevation, FIG. 4 is a plan of FIG. 3, FIG. 5 shows a modification of the invention, FIG. 6 is a plan of same but omitting the base, FIG. 7 is a perspective view showing a modified arrangement, FIG. 8 is the sectional side elevation of yet another embodiment, and FIG. 9 is a plan of FIG. 8.

In the drawing similar reference numerals are used for corresponding parts.

Referring first to the embodiment shown in FIGS. 1 and 2:

In this a light beam is thrown from a lamp 1 and lens 2 down onto a paper 3 above which is a transparency 4, the paper being photo-sensitive so that an image is formed thereon by exposure through the transparency 4.

To ensure that the paper 3 and any one of a number of transparencies 4, can be accurately positioned in relation to each other, and if desired also in relation to the light source 1, a pair of holders 5 and 6 are provided, these having clips 7 whereby the paper 3 and the transparency 4 are respectively held to the holders 5 and 6.

The holders 5 and 6 are each provided with three spherical abutment points 8, arranged in the form of a triangle as shown more particularly on the right hand side of FIG. 2, these abutment points 8 co-operating with three co-acting surfaces 9, 10 and 11, the co-acting surface 9 being in the form of a trihedral hole formed in a block 12, the surface 10 being in the form of a V groove formed in a block 13, and the surface 11 being a flat formed on a block 14.

It will now be realised that when a holder 5 or 6 is placed to bring the spherical abutment points 8 into register with the co-acting surfaces 9, 10 and 11, as these surfaces are arranged in a triangle, the holder will be accurately aligned in a plane in relation to the base and will not tilt.

At the same time the trihedral hole 9 will give point location of the spherical abutment point 8 while the V groove 13 which will engage another of the spherical abutment points 8 will give angular alignment of the holder due to the axis of the V groove being other than at right angles to a line drawn outwardly from the trihedral hole 9.

The arrangement thus ensures that the three co-acting surfaces together ensure accurate alignment in a plane fixed relatively to the base, while the trihedral hole 9 ensures point fixation of the holder but still allowing it to angulate in the plane in which it is supported, the V groove 10 however giving angular alignment so that whenever the holder is placed into position on the base with the spherical abutment points 8 engaging the appropriate co-acting surfaces 9, 10 and 11 accurate register is ensured.

To make the invention more clear the spherical abutment points 8 and the three co-acting surfaces 9, 10 and 11 have been shown dotted on the right hand side of FIG. 2.

The correct loading to hold the holders 5 and 6 down onto the supporting surfaces is obtained from spring clips 15 and 16.

The blocks 12, 13 and 14 are supported on the base 18 in a permanent manner, and it will be realised that when in this specification a surface is referred to, it may be compounded of a number of faces such as the trihedral hole.

In the embodiment shown in FIGS. 3 and 4 the base 18 has the blocks 12, 13 and 14 containing respectively the trihedral hole 9, the V groove 10 and the flat 11, supported thereon but in this case the holder comprises a rectangular frame 21 supporting from it by means of stems 22 the spherical abutment points 8, alignment of the frame 21 being thus effected in the identical manner in which the holders 5 and 6 are supported and aligned in FIGS. 1 and 2.

The frame 21 is provided with clips 7 which hold a transparency 4 or other member.

In the embodiment shown in FIGS. 5 and 6 the base 18 has on it a pair of circumferentially V grooved blocks 25 which are engaged by two of the spherical abutment points 8, joined by a member 30A secured to the member 30 the third spherical abutment point 8 engaging a V groove 10 in a block 13, the member 8 being urged in the direction of the blocks 25 by a finger 26 which is mounted on a stem 27 axially slidable in an aperture through the block 13, and urged forwardly by means of a spring 28 encircling this stem 27, the spring being confined between the head 29 of the stem 27 and the block 13.

In this case the transparency 4 is shown as being held by the clip 30 to the frame 31 which joins the spherical abutment points 8, this embodiment differing somewhat from the first described embodiment in that instead of using a trihedral hole in a block to give the point fixing, the two blocks 25 co-act to give this point fixing as the contacting spherical abutment points 8 are urged into contact with them, the block 13 containing the V groove 10 forming the angular alignment means, the three spherical abutment points 8 between them of course giving alignment in the required plane so that this device operates similarly to the previously described embodiments excepting that the trihedral hole 9 and the flat 11 are replaced by the blocks 25 these of course giving the same number of contacting surfaces namely four as are contained in the trihedral hole 9 and the flat face 11.

If the embodiment shown in FIG. 7 an arrangement similar to FIGS. 1 and 2 is shown excepting that only a single holder, which is designated 5, is used, this holder having beneath it the similarly arranged spherical abutment points 8 and the trihedral hole 9, the V groove 10 and the flat face 11. These are however not shown in this embodiment but it will be realised that it would be possible, where a single transparency or the like is to be held in a plane contiguous to a flat base 18, for the trihedral hole 9 as well as the V groove 10 to be cut into the base 18 itself so that the holder 5 can then seat on the base with the same effect of alignment.

In the embodiment shown in FIGS. 8 and 9 the base 18 has on it three identical blocks 13 each containing in it a V groove 10, two of these blocks being aligned with the V groove in the same direction, the position of these blocks being designated 35, the third block 13 however having its V groove arranged at right angles to the other two V grooves, this block having its position indicated by 36.

In this device again the transparency 4 or other member is held by means of clips 7 to the frame 31 carrying the spherical abutment points 8 and therefore alignment with the base will again be effected in the same way through the spherical abutment points 8 being positioned by means of six faces which ensure correct location.

It is to be noted that in all of the embodiments the arrangement is always such that there are six co-operating faces.

We claim:

1. Means for accurately locating members for repetitive positioning in image production processes comprising three alignment members on a base and three co-operating abutment points on a member to be aligned thereon, the said alignment members on the base comprising between them at least six flat surfaces with at least two groups thereof having their surfaces intersecting, and the said co-operating abutment points each having spherical surfaces where they engage the said alignment members.

2. Means according to claim 1 wherein the alignment members comprise one group of three surfaces arranged to form a trihedral hole, a second group comprising a pair of intersecting surfaces to produce a V groove, and the third being a single plane surface whereby the trihedral hole gives point alignment, the V groove gives angular alignment about the trihedral hole, and the plane surface maintains the aligned member in one plane.

3. Means according to claim 1 wherein the alignment members comprise three groups of two intersecting surfaces forming a pair of V grooves in parallel alignment but spaced apart, and a V groove placed at right angles thereto.

4. Means according to claim 1 wherein the alignment members comprise two groups of surfaces forming V grooves about a pair of spaced axes at right angles to the plane of the member to be aligned, and a third V groove disposed in the plane of the member to be aligned and having its axis pointing between the first said V grooves.

References Cited in the file of this patent

UNITED STATES PATENTS

| | | |
|---|---|---|
| 1,543,991 | De Pamphilis | June 30, 1925 |
| 1,933,059 | Huebner | Oct. 31, 1933 |